C. E. TYLER,

Assignor to the NATIONAL PLOW-SHOE COMPANY.

Brogan.

No. 8,791. Reissued July 8, 1879.

Witnesses:
Floyd Farrie
D. P. Cowl

Chas. E. Tyler,
Inventor:- Assor to
The National Plow Shoe Co.,
by Johnson & Johnson
Att'ys.

N. PETERS, PHOTO-LITHOGRAPHER, WASHINGTON, D. C.

UNITED STATES PATENT OFFICE

CHARLES E. TYLER, OF GEORGETOWN, MASSACHUSETTS, ASSIGNOR TO THE NATIONAL PLOW SHOE COMPANY, OF NEW HAVEN, CONNECTICUT.

IMPROVEMENT IN BROGANS.

Specification forming part of Letters Patent No. 125,505, dated April 9, 1872; Reissue No. 8,791, dated July 8, 1879; application filed June 9, 1879.

*To all whom it may concern:*

Be it known that I, CHARLES E. TYLER, of Georgetown, in the county of Essex and State of Massachusetts, have invented a new and useful Improvement in Brogans, or what are termed by the trade "Plow-Shoes;" and I do hereby declare the same to be fully described in the following specification and represented in the accompanying drawings, in which—

Figure 2:
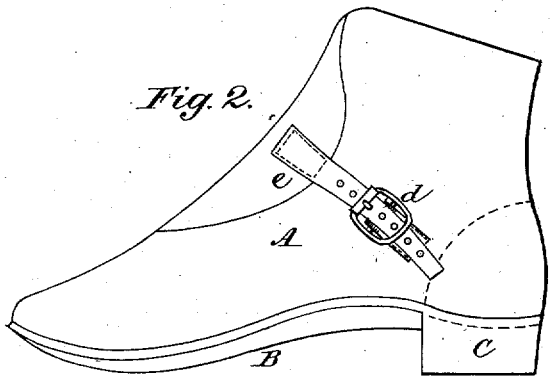
Figure 1:
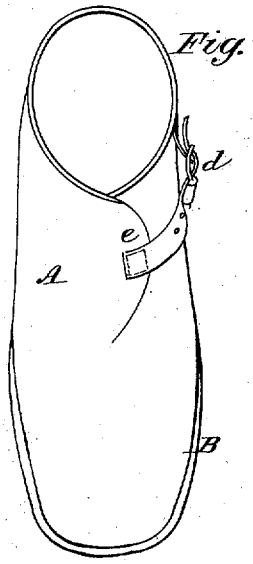
Figure 3:
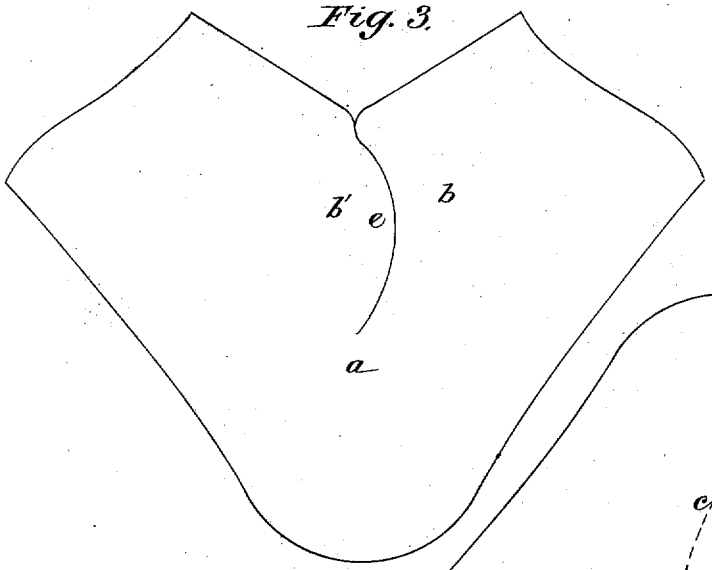
Figure 4:
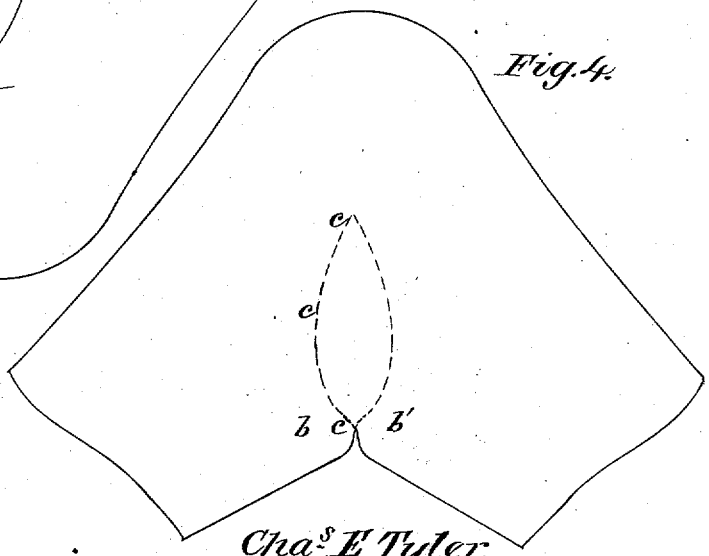

Figure 1 is a top view, and Fig. 2 a side elevation, of a brogan constructed in accordance with my invention. Fig. 3 is a representation of the upper of a brogan as developed on a plane surface, or as it appears when cut from a skin or side of leather, showing the line of the instep-opening. Fig. 4 is a similar representation of the upper of a brogan for which Letters Patent were granted to me April 25, 1871, the part within the dotted lines showing the portion that was cut out in order to give the proper shape or curvature to the instep.

The invention herein is an improvement on the aforementioned patent, the leading characteristic of said improvement, and wherein it differs from said patent, consisting of a shoe-upper in which the lapel or flap for folding over and closing the instep-opening is an integral part of the upper, and cut from one of the quarters and vamp, and forming an integral part of the other quarter and vamp, giving the required form to the shoe, and producing a better, neater, and more economical shoe of the kind than heretofore. The upper is of a single piece of leather, crimped into the proper form, and the cut for the instep-opening is made in a manner not only to place such opening within one of the quarters, but to form the lapel from that quarter over which it laps and from which it was taken; and I also claim a shoe formed with said lapel, as a new article of manufacture.

In Figs. 1 and 2 of the drawings, A denotes the upper, B the sole, and C the heel, of a brogan embodying my improvement.

In carrying out my invention, I cut from a cow-hide or other suitable kind of leather, or by means of a die or pattern, the blank or piece to constitute the upper of the brogan. This blank or piece is of the peculiar shape shown in Fig. 3, and is cut by the same die as that used in cutting the blank shown in Fig. 4, the two being identical in their areas. In such figures, *a* denotes the vamp or front portion, and *b b'* the quarters or heel portion. After the blank has been cut from the side or piece of leather, the vamp or front part of the blank is to be dampened and drawn over a block or former of the proper shape, and crimped or molded in order to give the desired curvature to the vamp. After the blank has become dry or set, instead of cutting the vamp so that the two quarters or instep portions *b b'* shall be of the same size and form as in my said patented invention, (which is effected by cutting out the central portion, as shown by the dotted lines in Fig. 4,) I cut one of the quarters or instep portions, *b*, of the same size and contour as that of the patented invention, as shown by one of the dotted lines *c c c* in said figure, and leave the portion embraced within the dotted lines of such figure attached to the fellow instep portion to form a lapel, *e*, to fold over and upon the lesser instep portion, and thereby close the lacing slit or opening, as found in my said patented brogan.

The lapel thus cut is an integral part of the shoe-upper and of one of the quarters, and is taken from that part of the other quarter and vamp over which the lapel folds when the shoe is made, giving the required form to an upper made of a single piece of leather, and having only a single heel-seam. The heel portions are then brought together and united by sewing. A buckle, *d*, is affixed by a short strap to the lesser quarter or instep portion, *b*, and a leather tongue to its fellow portion, and the latter folded and drawn over the former, so as to close the instep-opening.

In case the piece of leather may not be of sufficient size to form the blank or upper of the shoe entire, as shown in Fig. 3, two pieces may be employed; but the main portion of the upper would consist of one entire piece of such size and so cut that the lapel shall be taken out of the part over which it folds to close the instep-opening.

A shoe made with a lapel cut and formed as herein stated makes a new manufacture in the trade.

I claim—

1. As an improved article of manufacture, a boot or shoe having a front or instep opening provided with a lapel cut from one of the quarters and vamp, and forming an integral part of the opposite quarter, and adapted to fold over the part from which it was taken and close the instep-opening, all substantially as set forth.

2. A boot or shoe upper having a front or instep-opening provided with a lapel cut from one side of the opening, and forming an integral part of the opposite side, and adapted to fold over upon the portion from which it was cut and close the instep-opening, as set forth.

3. A boot or shoe having its upper of a single piece of leather, with a heel-seam only, having an instep-opening provided with a lapel cut from one side of its opening, and forming an integral part of the opposite side, adapted to close the opening, all substantially as set forth.

4. An improved method of cutting boot and shoe uppers, consisting in forming the instep-opening by a curved cut, and subsequently crimping the upper into form with the lapel formed by said cut, substantially as shown and described.

In testimony whereof I have hereunto set my hand.

CHARLES E. TYLER.

Witnesses:
WILLIAM B. RICH,
H. S. BARRY.